(12) United States Patent
Zhang et al.

(10) Patent No.: US 12,492,304 B2
(45) Date of Patent: Dec. 9, 2025

(54) AQUEOUS DISPERSION OF OPACIFYING PIGMENT PARTICLES AND COLORANT

(71) Applicant: Rohm and Haas Company, Collegeville, PA (US)

(72) Inventors: Qing Zhang, Collegeville, PA (US); Yujie Lu, Blue Bell, PA (US)

(73) Assignee: Rohm and Haas Company, Collegeville, PA (US)

( * ) Notice: Subject to any disclaimer, the term of this patent is extended or adjusted under 35 U.S.C. 154(b) by 123 days.

(21) Appl. No.: 18/027,673

(22) PCT Filed: Sep. 24, 2021

(86) PCT No.: PCT/US2021/051890
§ 371 (c)(1),
(2) Date: Mar. 22, 2023

(87) PCT Pub. No.: WO2022/076178
PCT Pub. Date: Apr. 14, 2022

(65) Prior Publication Data
US 2023/0383112 A1    Nov. 30, 2023

(51) Int. Cl.
*C08L 33/12* (2006.01)
*C09D 5/32* (2006.01)
*C09D 133/12* (2006.01)

(52) U.S. Cl.
CPC ........... *C08L 33/12* (2013.01); *C09D 5/32* (2013.01); *C09D 133/12* (2013.01); *C08L 2201/54* (2013.01); *C08L 2207/53* (2013.01)

(58) Field of Classification Search
None
See application file for complete search history.

(56) References Cited

U.S. PATENT DOCUMENTS 6,020,435 A   2/2000  Blankenship et al.
7,691,942 B2  4/2010  Bardman et al.

*Primary Examiner* — Jeffrey D Washville
(74) *Attorney, Agent, or Firm* — Reid Willis

(57) ABSTRACT

The present invention relates to a composition comprising 1) an aqueous dispersion of multistage opacifying polymer particles with a superposing binder layer; 2) a colorant; and 3) inorganic opacifying pigment particles. The composition of the present invention is useful for one coat hide paint formulations.

9 Claims, No Drawings

AQUEOUS DISPERSION OF OPACIFYING PIGMENT PARTICLES AND COLORANT

BACKGROUND OF THE INVENTION

The present invention relates to an aqueous dispersion of a) multistage opacifying polymer particles with a superposing binder layer; b) a colorant; and c) inorganic opacifying pigment particles.

A fundamental property of architectural paint is to cover (hide) the background color. The ability to hide background with a single coat, so-called one-coat hiding, has long been a goal in the paint industry. The difficulties in achieving one-coat hiding relates to the orthogonal nature two essential properties: hiding, as measured by high contrast ratio, and whiteness, as measured by Y-reflectance.

High hiding can be achieved through both light scattering and light absorption. Light absorption is effective in increasing the hiding of a paint film; however, colorants generally only absorb light in a certain wavelength range (which gives the film a certain color). Significantly, since absorbed light will not reflect, the whiteness of the film (Y-reflectance) is disadvantageously attenuated. Hiding and whiteness are achieved using high refractive index particles such as $TiO_2$ particles. Although $TiO_2$ is the most common opacifying pigment used in the paint industry, the crowding effect at high $TiO_2$ levels adversely impacts scattering efficiency. Other pigments such as opacifying organic hollow sphere polymer particles and inorganic extenders can be used to reduce the loading of $TiO_2$ in paint formulations, but at the cost of reducing hiding or Y-reflectance to levels outside the requirements for achieving one-coat hiding in films. It would therefore be advantageous in the field of architectural coatings to find a coating formulation that has the requisite hiding and whiteness to achieve one-coat hiding in architectural coatings.

SUMMARY OF THE INVENTION

The present invention addresses a need in the art by providing a composition comprising an aqueous dispersion of
1) multistage polymer particles comprising:
   a) a water-occluded core comprising from 20 to 60 weight percent structural units of a salt of a carboxylic acid monomer and from 40 to 80 weight percent structural units of a nonionic monoethylenically unsaturated monomer;
   b) a polymeric shell having a $T_g$ in the range of from 60° C. and 120° C.; and
   c) a polymeric binder layer superposing the shell, which polymeric binder layer has a $T_g$ of not greater than 35° C. and comprises structural units of at least one monoethylenically unsaturated monomer;
   wherein the weight-to-weight ratio of structural units of monomers in the water-occluded core to the shell in the multistage polymer particles is in the range of 1:10 to 1:20;
   the weight-to-weight ratio of the polymer binder to the sum of the shell and the structural units of monomers in the core in the multistage polymer particles is in the range of 1:1 to 3.5:1; and
   the z-average particle size of the multistage polymer particles is in the range of from 300 nm to 750 nm;
2) from 0.01 to 0.05 weight percent, based on the weight of the composition, of a colorant that absorbs light in the range of from 500 nm to 600 nm, and
3) an opacifying inorganic pigment having a pigment volume concentration in the range of from 25% to 40%.

The composition of the present invention addresses a need in the art by providing a pathway to a one-coat hide paint formulation.

DETAILED DESCRIPTION OF THE INVENTION

The present invention provides a composition comprising an aqueous dispersion of
1) multistage polymer particles comprising:
   a) a water-occluded core comprising from 20 to 60 weight percent structural units of a salt of a carboxylic acid monomer and from 40 to 80 weight percent structural units of a nonionic monoethylenically unsaturated monomer;
   b) a polymeric shell having a $T_g$ in the range of from 60° C. and 120° C.; and
   c) a polymeric binder layer superposing the shell, which polymeric binder layer has a $T_g$ of not greater than 35° C. and comprises structural units of at least one monoethylenically unsaturated monomer;
   wherein the weight-to-weight ratio of structural units of monomers in the water-occluded core to the shell in the multistage polymer particles is in the range of 1:10 to 1:20;
   the weight-to-weight ratio of the polymer binder to the sum of the shell and the structural units of monomers in the core in the multistage polymer particles is in the range of 1:1 to 3.5:1; and
   the z-average particle size of the multistage polymer particles is in the range of from 300 nm to 750 nm;
2) from 0.01 to 0.05 weight percent, based on the weight of the composition, of a colorant that absorbs light in the range of from 500 nm to 600 nm, and
3) an opacifying inorganic pigment having a pigment volume concentration in the range of from 25% to 40%.

The water-occluded core of the multistage polymer particles comprises from 20, preferably from 25, more preferably from 30, and most preferably from 32 weight percent, to 60, preferably to 50, more preferably to 40, and most preferably 36 weight percent structural units of a salt of a carboxylic acid monomer based on the weight of structural units of monomers in the core.

As used herein, the term "structural units" refers to the remnant of the recited monomer after polymerization. For example, a structural unit of a salt of methacrylic acid, where $M^+$ is a counterion, preferably a lithium, sodium, or potassium counterion, is as illustrated:

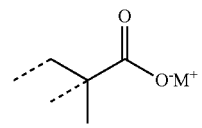

structural unit of a salt of methacrylic acid

Examples of suitable carboxylic acid monomers include acrylic acid, methacrylic acid, itaconic acid, and maleic acid.

The water-occluded core further comprises from 40, preferably from 50, more preferably from 55, more preferably from 60, and most preferably from 64 weight percent to 80, preferably to 75, more preferably to 70, and most preferably to 68 weight percent structural units of a nonionic monoethylenically unsaturated monomer based on the weight of structural units of monomers in the core. Examples of nonionic monoethylenically unsaturated monomers include one or more acrylates and/or methacrylates such as methyl acrylate, ethyl acrylate, n-butyl acrylate, t-butyl acrylate 2-ethylhexyl acrylate, methyl methacrylate, n-butyl methacrylate, t-butyl methacrylate, isobutyl methacrylate, isobornyl methacrylate, lauryl methacrylate, and cyclohexyl methacrylate; and one or more monoethylenically unsaturated aromatic compounds such as styrene, α-methylstyrene, and 4-t-butylstyrene. A preferred nonionic monoethylenically unsaturated monomer is methyl methacrylate.

The polymeric shell of the multistage polymer particles preferably has a $T_g$ in the range of not less than 80° C., more preferably not less than 90° C., and most preferably not less than 95° C., and preferably not greater than 115° C., and most preferably not greater than 110° C. As used herein, $T_g$ refers to the glass transition temperature as calculated by the Fox equation.

Preferably, the shell of the multistage polymer particles comprises structural units of methyl methacrylate, styrene, α-methylstyrene, isobornyl methacrylate, lauryl methacrylate, or cyclohexyl methacrylate. In one embodiment, the shell comprises at least 80, more preferably at least 90, and most preferably at least 95 weight percent structural units of styrene. In another embodiment, the shell comprises from 89 to 93 weight percent structural units of styrene and from 7 to 11 weight percent structural units of any or all of methyl methacrylate (4 to 5 weight percent), cyclohexyl methacrylate (0.9 to 2 weight percent), methacrylic acid (2 to 3 weight percent), and allyl methacrylate (ALMA, 0.1 to 0.5 weight percent).

The shell of the multistage polymer particles may also further comprise structural units of other multiethylenically unsaturated monomers such as divinyl benzene (DVB), trimethylolpropane trimethacrylate (TMPTMA), or trimethylolpropane triacrylate (TMPTA).

As used herein, "polymeric binder" refers to a polymeric material that is film forming on a desired substrate, with or without a coalescent. In one aspect, the $T_g$ of the polymeric binder as calculated by the Fox equation is not greater than 25° C.; in another aspect, not greater than 15° C., in another aspect, not greater than 10° C., and in another aspect not less than −20° C., and in another aspect not less than −10° C.

Examples of suitable polymeric binder materials include acrylic, styrene-acrylic, vinyl esters such as vinyl acetate and vinyl versatates, and vinyl ester-ethylene polymeric binders. Acrylic binders comprising structural units of methyl methacrylate and structural units of one or more acrylates such as methyl acrylate, ethyl acrylate, n-butyl acrylate, or 2-ethylhexyl acrylate, are especially preferred, as are styrene-acrylic binders.

Preferably, the weight-to-weight ratio of structural units of monomers of the core to the shell in the multistage polymer particles is in the range of 1:12 to 1:16. Preferably, the weight-to-weight ratio of the polymer binder to the sum of the structural units of monomers of the core and the shell in the multistage polymer particles is in the range of from 1.2:1, more preferably from 1.5:1, and most preferably from 1.8:1, to preferably 3.0:1, more preferably to 2.5:1, and most preferably to 2.2:1.

The z-average particle size of the multistage polymer particles is in the range of from 400 nm, more preferably from 450 nm, most preferably from 475 nm, to preferably 700 nm, more preferably 600 nm, and most preferably to 550 nm. As used herein, z-average particle size refers to particle size as determined by dynamic light scattering, for example by a BI-90 Plus Particle Size Analyzer (Brookhaven).

The aqueous dispersion of multistage polymer particles can be prepared as described in U.S. Pat. No. 7,691,942 B2. An example of a preferred method of preparing the dispersion of multistage polymer particles is shown in Intermediate Example 1 of the Example section.

The colorant that absorbs light in the range of from 500 nm to 600 nm is present in the composition at a concentration in the range of from 0.010, and preferably from 0.015 weight percent, to 0.050, preferably to 0.040, more preferably to 0.035 weight percent, and most preferably to 0.030 weight percent based on the weight of the composition. Examples of suitable colorants include Lampblack, commercially available as Colortrend 808-9907 Lampblack; Fe/Cr complexes commercially available as Sicopal Black L 0095 Fe/Cr Complex; Phthalo Green, commercially available as Colortrend 808-5511 Phthalo Green; and Yellow Iron Oxide, commercially available as Colortrend 808 1810 Yellow Iron Oxide.

Opacifying inorganic pigments include $TiO_2$ and ZnO. The composition preferably further comprises from 0.5%, more preferably from 1%, more preferably from 2%, and most preferably from 4% pigment volume concentration, to 20%, more preferably to 15%, and most preferably to 12% pigment volume concentration of an organic opacifying pigment to reduce the loading requirement of opacifying inorganic pigment and maintain the high hiding required for a one coat hide formulation. Examples of organic opacifying pigments are organic opaque polymers, which are multistage polymer particles that comprise a water-occluded core and a high $T_g$ shell, but without a superposing binder layer. Commercial examples of opaque polymers include ROPAQUE™ Ultra Opaque Polymers. (ROPAQUE is a Trademark of The Dow Chemical Company or its Affiliates.) The composition may further include other materials such as coalescents, rheology modifiers, surfactants, defoamers, and extenders.

To achieve one coat hide, it is highly advantageous to prepare a coating formulation which, when applied to a substrate at a wet thickness of 2 mil to 4 mil and allowed to dry, has a contrast ratio of at least 99.5% and a Y-reflectance of at least 91.0%. As the following examples and comparative examples amply demonstrate, only compositions containing the multistage polymer particles, opacifying pigment particles, and absorbing colorant over a very narrow concentration range achieve this desired goal.

In the follow Table 1, Acrylic latex refers to a BA/EA/MMA/MAA/PEM latex; Opaque polymer refers to ROPAQUE Ultra EF Opaque Polymer; Defoamer refers to Foamstar A-34 Defoamer; $TiO_2$ refers to Kronos 4311 $TiO_2$; Coalescent refers to Texanol Coalescent; NHS-310 refers to Aquaflow NHS-310 Associative Thickener; and RM-895 refers to ACRYSOL™ RM-95 (ACRYSOL is a Trademark of the The Dow Chemical Company or its Affiliates.)

EXAMPLES

PVC Calculation

Pigment volume concentrations are calculated by the following formula:

$$PVC = \left[ \frac{Vol \text{ Pigment}}{Vol \text{ Pigment} + \text{Binder Solids}} \right] \times 100$$

where binder solids refers to the contribution of polymer from the polymer binder layer of the Intermediate Example 1 or to binder from the acrylic latex binder.

Intermediate Example 1—Preparation of an Aqueous Dispersion of Binder Coated Multistage Polymer Particles In the following Example, Core #1 refers to an aqueous dispersion of polymer particles (66 MMA/34 MAA, solids 31.9%, z-average particle size of 135 nm) prepared substantially as described in U.S. Pat. No. 6,020,435. A 5-liter, four necked round bottom flask was equipped a paddle stirrer, thermometer, $N_2$ inlet and reflux condenser. DI water (475 g) was added to the kettle and heated to 89° C. under $N_2$. Sodium persulfate (NaPS, 3 g in 25 g water) was added to vessel immediately followed by Core #1 (125 g). Monomer emulsion 1 (ME 1), which was prepared by mixing DI water (125.0 g), Disponil FES-32 emulsifier (10.0 g), styrene (424.2 g), methacrylic acid (7.0 g), linseed oil fatty acid (2.8 g), acrylonitrile (112.0 g), and divinyl benzene (14.0 g), was then added to the kettle over 60 min. The temperature of the reaction mixture was allowed to increase to 84° C. after 15 min and allowed to increase to 92° C. after 25 min. Upon completion of the ME 1 feed, the reaction was cooled to 60° C.

When the kettle temperature reached 80° C., an aqueous mixture of ferrous sulfate and EDTA (20 g, 0.1 wt. % $FeSO_4$, 1 wt. % EDTA) was added to the kettle. When the kettle temperature reached 60° C., co-feeds including a solution of t-butylhydroperoxide (t-BHP 1.9 g) and NaPS (5.0 g) mixed with DI water (100 g), along with a separate solution of isoascorbic acid (IAA, 2.6 g in 100 g water) were both added simultaneously to the kettle at a rate of 1.20 g/min. Two min after the charging of the co-feed solutions, ME 2, which was prepared by mixing DI water (240 g), Disponil FES-32 emulsifier (17.0 g), butyl acrylate (431.46 g), methyl methacrylate (430.54 g), 2-ethylhexyl acrylate (124.44 g), acetoacetoxyethyl methacrylate (25.5 g) and methacrylic acid (7.96 g), was added to the kettle over 60 min while allowing the temperature to rise to 86° C. without providing any external heat. Upon completion of ME 2 addition, the co-feed solutions were stopped and the batch was held for 5 min at 80-86° C. A solution of $NH_4OH$ (5 g, 28 wt. % aq.) mixed with DI water (5.0 g) was then added to the kettle along with hot (90° C.) DI water (175 g).

ME 3, which was prepared by mixing DI water (54.0 g), Disponil FES-32 emulsifier (3.0 g), butyl acrylate (104.4 g), methyl methacrylate (75.6 g), and 4-hydroxy TEMPO (3.0 g), was fed to the kettle over 5 min Immediately after the ME 3 feed addition was complete, $NH_4OH$ (35.0 g, 28 wt. % aq.) mixed with DI water (35 g) was added to the kettle over 2 min. When $NH_4OH$ addition was complete, the batch was held for 5 min. The addition the co-feed solutions was resumed at 1.2 g/min until completion, whereupon the dispersion was cooled to 25° C. While cooling, additional co-feeds including a solution of t-BHP (1.5 g) in DI water (25 g), along with a separate solution of IAA (0.7 g) in water (25 g) were both added simultaneously to the kettle at a rate of 1.30 g/min. Upon completion of addition of the second co-feed, the dispersion was filtered to remove any coagulum. The filtered opaque acrylic dispersion (OAP) had a solids content of 48.7%. The S/mil was measured to be 1.03 with collapse of 0.0%.

Table 1 illustrates the Example and Comparative Example paint formulations without colorant. Contrast ratio and Y-reflectance were measured as follows: Paints were drawn down on an opacity chart (Leneta Form 5C) using a 3-mil bird bar and allowed to dry overnight in a controlled temperature and humidity room (50% RH/22° C.). An XRite reflectometer was used to measure the Y-reflectance over the black (Y black) and white portions (Y white) of the chart. Three measurements were taken and the average Y-reflectance were recorded. The reflectance over the black portion of the charts (Y black) is used to characterize the whiteness of the film. The contrast ratio was calculated by the following formula: Contrast Ratio=(Y black/Y white)*10. Table 2 shows Y-reflectance and Contrast Ratio data for the paints at various concentrations of Colortrend 808-9907 Lampblack (colorant).

TABLE 1

Paint Formulations without Colorant

|  | Without Int. 1 | | With Int. 1 | |
| --- | --- | --- | --- | --- |
| Materials | (g) | PVC | (g) | PVC |
| Premix | | | | |
| Acrylic latex | 627.8 | | | |
| Intermediate 1 | | | 582.2 | |
| Opaque polymer | 46.9 | 5.6% PVC | 49.3 | 5.6% PVC |
| Defoamer | 0.6 | | 0.6 | |
| $TiO_2$ | 645.6 | 30% PVC | 678.5 | 30% PVC |
| LetDown | | | | |
| Propylene Glycol | 9.4 | | 9.9 | |
| Coalescent | 14.01 | | 17.7 | |
| Defoamer | 0.6 | | 0.6 | |
| NHS-310 | 10.0 | | 19.9 | |
| RM-895 | 3.7 | | 47.3 | |
| Water | 58.1 | | 12.1 | |
| Totals | 1416.7 | | 1418.3 | |
| Total Vol. (mL) | 1000 | | 1000 | |
| Total PVC | 35.59% | | 35.59% | |
| Properties | | | | |
| Contrast ratio | 94.0 | | 95.6 | |
| Reflectance | 99.0% | | 99.3% | |

The requirement for one coat paint formulations of contrast ratio ≥99.5 and reflectance of ≥91.0 are not achieved without addition of the absorbing colorant. Table 2 illustrates Y-reflectance and contrast ratio properties for coatings prepared from paint formulations with and without Colortrend 808-9907 Lampblack Colorant.

TABLE 2

Y-Reflectance and Contrast Ratio of Coatings with Lampblack Colorant

| Comp. 1-2 | | | Ex. 1-3 | | |
| --- | --- | --- | --- | --- | --- |
| Colorant (wt %) | Y-reflectance | Contrast ratio | Colorant (wt %) | Y-reflectance | Contrast ratio |
| 0 | 94.0 | 99.0% | 0 | 95.6 | 99.3% |
| 0.015% | 91.0 | 99.3% | 0.020% | 93.3 | 99.6% |
| 0.03% | 90.0 | 99.5% | 0.028% | 91.0 | 99.8% |

The data show that the critical Y-reflectance minimum of at least 91.0 and the contrast ratio of at least 99.5 is only achieved with the multistage polymer particles used in the formulation of the present invention. Acceptable Y-reflectance or acceptable contrast ratio, but not both, are observed for coatings derived from paint formulations that contains the acrylic binder and opaque polymer, but no multistage polymer particles with a superposing binder layer (that is, with no Intermediate 1). It has been surprisingly been discovered that one coat hide can be achieved with coatings having a wet film thickness in the range of from 2-mil to 4-mil.

The invention claimed is:

1. A composition comprising an aqueous dispersion of
1) multistage polymer particles comprising:
   a) a water-occluded core comprising from 20 to 60 weight percent structural units of a salt of a carboxylic acid monomer and from 40 to 80 weight percent structural units of a nonionic monoethylenically unsaturated monomer;
   b) a polymeric shell having a $T_g$ in the range of from 60° C. and 120° C.; and
   c) a polymeric binder layer superposing the shell, which polymeric binder layer has a $T_g$ of not greater than 35° C. and comprises structural units of at least one monoethylenically unsaturated monomer;
   wherein the weight-to-weight ratio of structural units of monomers in the water-occluded core to the shell in the multistage polymer particles is in the range of 1:10 to 1:20;
   the weight-to-weight ratio of the polymer binder to the sum of the shell and the structural units of monomers in the core in the multistage polymer particles is in the range of 1:1 to 3.5:1; and
   the z-average particle size of the multistage polymer particles is in the range of from 300 nm to 750 nm;
2) from 0.01 to 0.05 weight percent, based on the weight of the composition, of a colorant that absorbs light in the range of from 500 nm to 600 nm, and
3) an opacifying inorganic pigment having a pigment volume concentration in the range of from 25% to 40%.

2. The composition of claim 1 wherein the multistage polymer particle shell comprises at least 80 weight percent structural units of styrene and has a $T_g$ in the range of from 90° C. to 115° C.; wherein the multistage polymer particle water-occluded core comprises from 30 to 50 weight percent structural units of a salt of a carboxylic acid monomer, and from 50 to 70 weight percent structural units of the nonionic monoethylenically unsaturated monomer based on the weight of structural units of monomers in the core; wherein the opacifying inorganic pigment is $TiO_2$ or ZnO; and wherein the colorant is present at a concentration in the range of from 0.015 to 0.040 weight percent, based on the weight of the composition.

3. The composition of claim 2 which further comprises organic opaque polymers at a pigment volume concentration in the range of from 0.5% to 20%; wherein the nonionic monoethylenically unsaturated monomer is one or more acrylates or methacrylates selected from the group consisting of methyl acrylate, ethyl acrylate, n-butyl acrylate, t-butyl acrylate 2-ethylhexyl acrylate, methyl methacrylate, n-butyl methacrylate, t-butyl methacrylate, isobutyl methacrylate, isobornyl methacrylate, lauryl methacrylate, and cyclohexyl methacrylate; and a monoethylenically unsaturated aromatic compounds selected from the group consisting of styrene, α-methylstyrene, and 4-t-butylstyrene; wherein the opacifying inorganic pigment is $TiO_2$; and wherein the colorant is present at a concentration in the range of from 0.015 to 0.035 weight percent, based on the weight of the composition.

4. The composition of claim 3 wherein the shell comprises from 89 to 93 weight percent structural units of styrene, and from 7 to 11 weight percent structural units of one or more additional monomers selected from the group consisting of methyl methacrylate, cyclohexyl methacrylate, methacrylic acid, and allyl methacrylate; and wherein the pigment volume concentration of organic opaque polymers is in the range of from 2% to 15%; and wherein the colorant is present at a concentration in the range of from 0.015 to 0.035 weight percent, based on the weight of the composition.

5. The composition of claim 3 wherein the shell comprises from 89 to 93 weight percent structural units of styrene, and from 4 to 5 weight percent structural units of methyl methacrylate, from 0.9 to 2 weight percent structural units of cyclohexyl methacrylate, from 2 to 3 weight percent structural units of methacrylic acid, and from 0.1 to 0.5 weight percent structural units of allyl methacrylate; wherein the salt of the carboxylic acid monomer is a salt of methacrylic acid; wherein the polymer binder is an acrylic or styrene acrylic binder having a $T_g$ in the range of from −20° C. to 15° C.; and wherein the pigment volume concentration of organic opaque polymers is in the range of from 2% to 15%; and wherein the colorant is present at a concentration in the range of from 0.015 to 0.035 weight percent, based on the weight of the composition.

6. The composition of claim 5 wherein the weight-to-weight ratio of the polymer binder to the sum of the structural units of monomers of the core and the shell in the multistage polymer particles is in the range of from 1.5:1 to 2.5:1; and the weight-to-weight ratio of structural units of monomers of the core to the shell in multistage polymer particles is in the range of 1:12 to 1:16; wherein the z-average particle size of the multistage polymer particles is in the range of from 450 nm to 600 nm; wherein the pigment volume concentration of organic opaque polymers is in the range of from 4% to 15%; and wherein the colorant is a lampblack, an Fe/Cr complex, phthalo green, or yellow iron oxide colorant.

7. The composition of claim 6 which further comprises at least one material selected from the group consisting of coalescents, rheology modifiers, surfactants, defoamers, and extenders; wherein the colorant is a lamp black colorant.

8. The composition of claim 7 which is a paint which, when applied to a substrate at a wet film thickness in the range of from 2 mils to 4 mils and then allowed to dry, provides a dry coating having a Y-reflectance of greater than 91.0 and a contrast ratio of greater than 99.5.

9. A method comprising a) applying a 2-mil to 4-mil thick coating of the composition of claim 7 to a substrate, and b) allowing the coating to dry, to provide a dry film having a Y-reflectance of greater than 91.0 and a contrast ratio of greater than 99.5.

* * * * *